United States Patent
Shaklik et al.

(10) Patent No.: US 6,329,724 B1
(45) Date of Patent: Dec. 11, 2001

(54) INTEGRATED KNEE BOLSTER / IGNITION SWITCH

(75) Inventors: Brian M. Shaklik, Leo; James I. Pennington, Fort Wayne, both of IN (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/565,272

(22) Filed: May 5, 2000

(51) Int. Cl.[7] ................................................ B60R 21/045
(52) U.S. Cl. .......................................... 307/10.1; 307/10.6
(58) Field of Search .................................. 307/9.1, 10.1, 307/10.3, 10.6

(56) References Cited

U.S. PATENT DOCUMENTS

| | | | |
|---|---|---|---|
| 3,090,871 | * | 5/1963 | Gorman ................................ 307/10.1 |
| 5,370,417 | * | 12/1994 | Kelman et al. ....................... 280/751 |

FOREIGN PATENT DOCUMENTS

| | | | | |
|---|---|---|---|---|
| 2324508A | * | 10/1998 | (GB) | ............................ B60R/21/045 |
| 2334920A | * | 9/1999 | (GB) | ............................ B60R/21/045 |
| 09309394A | * | 12/1997 | (JP) | ............................ B60R/21/045 |

* cited by examiner

*Primary Examiner*—Fritz M. Fleming
(74) *Attorney, Agent, or Firm*—Jeffrey P. Calfa; Dennis Kelly Sullivan; Neil T. Powell

(57) ABSTRACT

An occupant compartment of an automotive vehicle contains an instrument panel to the rear of which an occupant of the vehicle may be seated. A knee bolster is disposed below the instrument panel frontally of the occupant's knees and has a through-opening toward the occupant. A movable cover selectively closes and opens the through-opening. When the cover is closed, it covers a key that was inserted into the vehicle ignition switch and turned to operate the switch to turn on the engine while the cover was open. The ignition switch is disposed in a mounting that extends outward when the cover is opened to render the switch accessible for key insertion, key operation, and key removal. When the cover is closed, the mounting and switch retract within the knee bolster.

16 Claims, 1 Drawing Sheet

INTEGRATED KNEE BOLSTER / IGNITION SWITCH

FIELD OF THE INVENTION

This invention relates generally to motor vehicles, and in particular to the integration of an ignition switch with a knee bolster in an occupant compartment of a motor vehicle.

BACKGROUND AND SUMMARY OF THE INVENTION

A motor vehicle contains an electrical system that typically includes a switch for turning the engine on and off. Such a switch is commonly referred to as an ignition switch. One type of ignition switch that is used in motor vehicles is a key-operated, mechanical switch. When the shaft of a correct metal key is inserted into the switch, the protruding base of the key may be turned to operate the switch from an OFF position to a selected one of one or more additional positions. Such additional switch positions may include ON (or RUN) position, START position, and ACCESSORY position. In an electrical system of a motor vehicle, the ignition switch typically controls the delivery of electricity to an engine electrical system. When the ignition switch is operated to ON position, the engine electrical system is energized, allowing the vehicle engine to be started when the switch is further operated to START position, and after having been started, to continue to run until the switch is finally turned to OFF position.

It is known to mount ignition switches in both steering columns and instrument panels. In a vehicle such as a medium or heavy truck, ignition switch mounting in the instrument panel is believed more common than in the steering column. An ignition switch mounting location that is convenient for a driver in a particular vehicle may however be poorly suited for compliance with certain governmental laws and/or regulations relating to that vehicle. For example, the protruding portion of an ignition switch key whose shaft is inserted into an ignition switch may be disposed in a location that could be deemed non-compliant with such laws and/or regulations. But an ignition switch mounting location that avoids such non-compliance may be objectionable from other standpoints, such as driver inconvenience, or requiring the mounting locations of other devices to be changed. While the use of ignition switches that do not require metal keys, such as those having keypads for entering access codes, or those that read coded devices such as cards, may avoid non-compliance with such laws and/or regulations, they are apt to involve the use of additional hardware and software, and may be more expensive than the mechanical, key-operated ignition switches presently used in many vehicles. Hence, it is believed desirable to retain the use of key-operated ignition switches, provided that they can be mounted in ways that achieve compliance with law and/or regulation without excessive inconvenience to the driver.

One aspect of the present invention relates to a new and unique ignition switch mounting that is conveniently accessible to a driver, that uses a mechanical ignition switch operated by a conventional metal key, and that is believed to comply with relevant governmental laws and/or regulations relating to motor vehicles. Briefly, the invention relates to a mechanism that integrates such an ignition switch with a knee bolster.

A knee bolster comprises a structure that is disposed in the occupant compartment of a motor vehicle, such as the cab of a truck, below the instrument panel and frontally of an occupant's knees. Various forms of knee bolsters are known. One purpose of a knee bolster is to provide an abutment for the knees of a seated occupant in the event of a frontal collision in which the occupant tends to move forward within the occupant compartment. An objective of such abutment is to avoid occurrence of a phenomenon known as occupant submarining. Because a knee bolster is intended to be impacted by an occupant's knees, it is ideally constructed to avoid impact injury to the knees.

The invention, in one general respect, may be considered to relate to an automotive vehicle comprising an engine for propelling the vehicle, an occupant compartment comprising an instrument panel to the rear of which an occupant of the vehicle may be seated, and a key-operated switch for turning the engine on and off. A knee bolster is disposed below the instrument panel frontally of the occupant's knees and comprises a zone that is open toward the occupant. A movable cover selectively closes and opens the open zone, including, when closing the open zone, covering a key that has been inserted into the switch and manipulated to operate the switch to turn the engine on, and when opening the open zone, rendering the switch accessible for allowing a key to be inserted into the switch, the key manipulated to operate the switch, and the key to be removed from the switch.

In another general respect, the invention may be considered to relate to an ignition switch mounting in an automotive vehicle comprising a knee bolster disposed forward of knees of a seated occupant in the vehicle and comprising a zone that is open toward a seated occupant in the vehicle. An ignition switch is accessible through the open zone to allow a key to be inserted into and removed from the switch. A movable cover selectively closes and opens the open zone, including covering a key inserted into the switch when the key is inserted into the switch and the cover is closing the open zone.

In still another general respect, the invention may be considered to relate to an ignition switch mounting in an automotive vehicle comprising a vehicle panel. The panel comprises an open zone and a key-operated ignition switch. A movable cover selectively closes and opens the open zone. A mounting mounts the ignition switch and can be displaced bodily relative to the open zone selectively to a retracted position and to an extended position, thereby similarly bodily displacing the ignition switch. A key can be inserted into the ignition switch when the cover is opening the open zone and mounting is in the extended position, and the cover covers a key inserted into the switch when the mounting is in the retracted position and the cover is closing the open zone.

The foregoing, along with further features and advantages of the invention, will be seen in the following disclosure of a presently preferred embodiment of the invention depicting the best mode contemplated at this time for carrying out the invention. The disclosure includes a drawing, briefly described as follows.

DESCRIPTION OF THE PREFERRED EMBODIMENT

Figure 1:
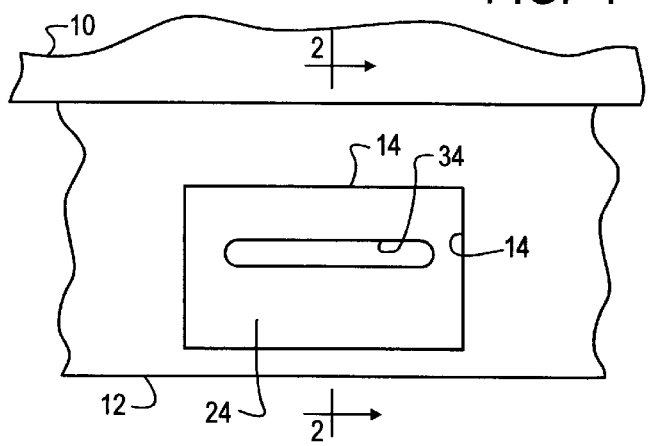
FIG. 1 is a fragmentary elevation view looking forward within the occupant compartment of a motor vehicle, as taken in the general direction of arrows 1—1 in FIG. 2, and showing an ignition switch mounting integrated with a knee bolster in accordance with principles of the present invention.

FIG. 1 shows an exemplary ignition switch/knee bolster in an occupant compartment of a motor vehicle. The occupant compartment comprises an instrument panel 10 disposed forward of an occupant (not shown) seated in the vehicle. A knee bolster 12 is disposed below instrument panel 10 frontally of the occupant's knees and comprises a zone 14 that is open toward the seated occupant. The particular open zone 14 illustrated in the drawing is a rectangular-shaped through-opening in knee bolster 12.

An ignition switch 16 is disposed in a mounting 18 integrated with knee bolster 12. The illustrated mounting comprises a walled structure containing a central through-hole within which the body of switch 16 is disposed. The switch body is secured on the walled structure by any suitable means of attachment. The illustrated mounting provides for the central longitudinal axis of ignition switch 16 to be disposed in a generally horizontal orientation fore and aft in the vehicle. Hence, the wall containing the central through-hole within which the switch body is disposed is itself generally vertically disposed.

Figure 4:
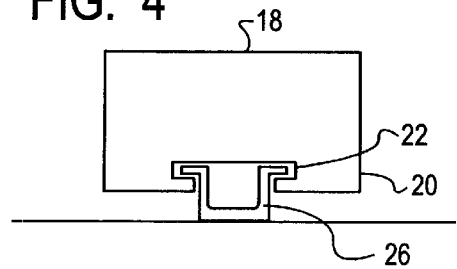
FIG. 4 is a view in the direction of arrows 4—4 in FIG. 2.

Mounting 18 further comprises a base 20 containing a straight slot 22 which is open at an interior end of base 20. The length of slot 22 is disposed fore and aft in the vehicle, but at an acute angle to the horizontal longitudinal axis of ignition switch 16. FIG. 4 shows slot 22 to have a T-shaped cross section as viewed in the direction of its length.

Figure 2:
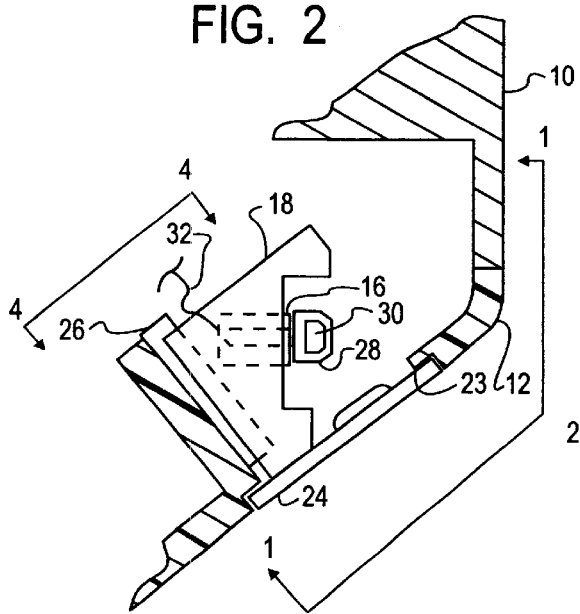
FIG. 2 is a cross section view in the direction of arrows 2—2 in FIG. 1 showing the switch mounting in a closed position.

A cover 24 joins with base 20 at an exterior end of base 20. Cover 24 has a rectangular shape that closely matches that of through-opening 14. FIG. 2 shows the closed position where cover 24 is seen to have a flush fit with through-opening 14. The margin of knee bolster 12 bounding through-opening 14 has a shoulder 23 that runs around the endless perimeter of the through opening and is disposed to be abutted by the margin of cover 24 when the latter is closing through-opening 14. The shoulder is located such that an external surface of cover 24 is flush with an external surface of knee bolster 12 when cover 24 is closing through-opening 14.

A track 26 is disposed interior of knee bolster 12. The length of track 26 runs fore and aft in the vehicle, but at an acute angle to the horizontal longitudinal axis of ignition switch 16. As viewed in the direction of its length, track 26 has a T-shaped cross section that is complementary to that of slot 22 so as to allow slot 22 to fit onto the track. This fit allows base 20 to slide along the length of track 26 without disengaging from the track. Assembly of base 20 to track 26 is accomplished by aligning the slot with the track and sliding the base onto the track.

Figure 3:
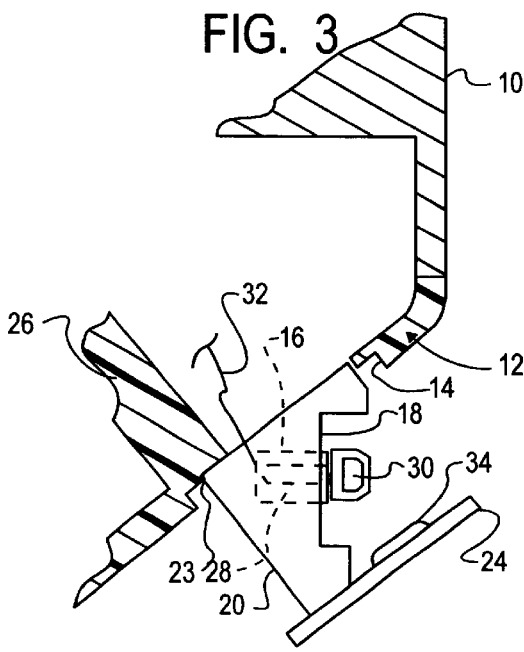
FIG. 3 is a view similar to FIG. 2, but showing the switch mounting in an open position.

Ignition switch 16 comprises a key-slot that is open in a direction facing the rear of the vehicle. FIGS. 2 and 3 show a metal key 28 whose shaft has been inserted into the key-slot. A base 30 of key 28 remains external to switch 16 and may be gripped between thumb and forefinger and turned to similarly turn key 28 about the switch axis to operate the switch to different positions. Electric wiring 32 extends from an interior end of switch 16 to connect the switch with the electrical system of the vehicle.

When the mounting is in the open position shown by FIG. 3, a driver may insert a key into the ignition switch key-slot and turn it to operate the switch. Turning the key to START position energizes the engine electrical system and starts the engine. An internal return spring returns the switch to ON position when the key is released from START position, and the engine will continue to run until shut off by turning the key to operate the switch to OFF position. When the mounting is in the closed position shown by FIG. 2, key 28 is inaccessible for turning by the driver, and cover 24 cooperates with knee bolster 12 to present a generally uninterrupted exterior free of protrusions or irregularities inconsistent with the purpose of the knee bolster. Hence, it may be desirable for both cover 24 and knee bolster 12 to comprise an impact absorbing layer.

After having started the engine, the occupant may manually push cover 24 to close through-opening 14, bodily moving the ignition switch interiorly of knee bolster 12 in the process. Alternatively, a motor, or other actuator, (not shown) may automatically move the mounting and close the cover in response to one or more predetermined conditions, for example when the vehicle is placed in a drive gear, or after a certain time interval has elapsed.

Cover 24 further comprises a recess 34 providing a fingertip grip which may be engaged by the fingertips of an occupant's hand for manually moving the cover from closed to open by pulling on the cover. It is also contemplated that a motor or actuator could open the cover automatically in response to certain conditions, such as loss of electric power supply for example.

Space provided by the switch mounting interiorly of cover 24 is sufficient to allow additional keys that are ganged together on a common key holder with the key inserted into the switch to occupy the space both when the cover is open and when the cover is closed. At least a portion of that space may contain material disposed to prevent the additional keys from rattling.

Although slot 22 and track 26 provide for the opening-closing motion along a straight line that is inclined to the horizontal, it is contemplated that certain principles of the invention can be practiced with other motions, such as pivoting motion. Moreover, although the illustrated embodiment of the invention bodily displaces the switch mounting and the switch with the cover, general principles of the invention contemplate that the cover motion may be independent of any motion of the switch and its mounting.

While a presently preferred embodiment of the invention has been illustrated and described, it should be appreciated that principles of the invention are applicable to all embodiments that fall within the scope of the following claims.

What is claimed Is:

1. An automotive vehicle comprising:
   an engine for propelling the vehicle;
   an occupant compartment comprising an instrument panel to the rear of which an occupant of the vehicle may be seated;
   a key-operated switch for turning the engine on and off;
   a knee bolster disposed below the instrument panel frontally of the occupant's knees and comprising a zone that is open toward the occupant;
   and a movable cover for selectively closing and opening the open zone, including, when closing the open zone, covering a key that has been inserted into the switch and manipulated to operate the switch to turn the engine on, and when opening the open zone, rendering the switch accessible to allow a key to be inserted into the switch, the key manipulated to operate the switch, and the key to be removed from the switch.

2. An automotive vehicle as set forth in claim 1 in which the cover comprises a perimeter that has a flush fit with a margin of the knee bolster around the open zone when the cover is closing the open zone.

3. An automotive vehicle as set forth in claim 2 in which the cover comprises an impact absorbing layer.

4. An automotive vehicle as set forth in claim 2 in which the cover comprises a recess providing a fingertip grip by which an occupant may manually pull on the cover to move the cover from closing the open zone to opening the open zone.

5. An automotive vehicle as set forth in claim 1 further including a switch mounting that mounts the switch, and that is movable with respect to the knee bolster for moving the switch bodily through the open area.

6. An automotive vehicle as set forth in claim 5 in which the cover is joined to the switch mounting and the bolster comprises a track that is engaged by the switch mounting and that guides the switch mounting and the cover for motion in unison as the cover is moved between closing and opening the open area.

7. An automotive vehicle as set forth in claim 6 in which the track guides the switch mounting and the cover for downward and outward motion relative to the knee bolster as the cover is moved from closing the open area to opening the open area.

8. An automotive vehicle as set forth in claim 1 further including a switch mounting which mounts the switch and which is joined with the cover such that switch mounting moves in unison with the switch cover as the latter is moved between closing and opening the open area, and in which the cover and switch mounting are constructed and arranged to provide a space sufficient to allow the key to be freely inserted into and extracted from the switch when the cover is opening the open area.

9. An automotive vehicle as set forth in claim 8 in which the space provided by the cover and the switch mounting is sufficient to allow additional keys that are ganged together on a common key holder with the key inserted into the switch to occupy the space both when the cover is opening the open area and when the cover is closing the open area.

10. An automotive vehicle as set forth in claim 9 in which at least a portion of the space provided by the cover and the switch mounting contains material disposed to prevent the additional keys from rattling.

11. An automotive vehicle as set forth in claim 1 in which the open zone comprises a through-opening in the knee bolster, the through-opening comprising an endless perimeter.

12. An automotive vehicle as set forth in claim 1 in which the switch is accessible at the open zone by bodily displacement of the switch relative to the open zone.

13. An automotive vehicle as set forth in claim 12 in which the switch is bodily displaced by movement of the cover between closing the open zone and opening the open zone.

14. An ignition switch mounting in an automotive vehicle comprising:
   a knee bolster disposed forward of knees of a seated occupant in the vehicle and comprising a zone that is open toward a seated occupant in the vehicle;
   an ignition switch that is accessible through the open zone to allow a key to be inserted into and removed from the switch;
   and a movable cover for selectively closing and opening the open zone, including covering a key inserted into the switch when the key is inserted into the switch and the cover is closing the open zone.

15. An automotive vehicle as set forth in claim 14 in which the switch is disposed in a mounting that is movable relative to the open zone.

16. An ignition switch mounting in an automotive vehicle comprising:
   a vehicle panel comprising an open zone;
   a key-operated ignition switch;
   a movable cover for selectively closing and opening the open zone; and
   a mounting which mounts the ignition switch and which can be displaced bodily relative to the open zone selectively to a retracted position and to an extended position, thereby similarly bodily displacing the ignition switch;
   wherein a key can be inserted into the ignition switch when the cover is opening the open zone and mounting is in the extended position, and wherein the cover covers a key inserted into the switch when the mounting is in the retracted position and the cover is closing the open zone.

* * * * *